US012675452B2

(12) United States Patent
Manchanda et al.

(10) Patent No.: US 12,675,452 B2
(45) Date of Patent: Jul. 7, 2026

(54) AUTOMATED CORRECTION OF ATTRIBUTES USING MACHINE-LEARNED LARGE LANGUAGE MODELS (LLMS)

(71) Applicant: Maplebear Inc., San Francisco, CA (US)

(72) Inventors: Saurav Manchanda, Seattle, WA (US); Paul Harrison Baranowski, Waxhaw, NC (US); Ashna Sebastian, Vaughan (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/786,352

(22) Filed: Jul. 26, 2024

(65) Prior Publication Data

US 2025/0036604 A1 Jan. 30, 2025

Related U.S. Application Data

(60) Provisional application No. 63/529,349, filed on Jul. 27, 2023.

(51) Int. Cl.
| | |
|---|---|
| *G06F 16/215* | (2019.01) |
| *G06F 16/23* | (2019.01) |
| *G06F 40/205* | (2020.01) |

(52) U.S. Cl.
CPC ........ *G06F 16/215* (2019.01); *G06F 16/2365* (2019.01); *G06F 40/205* (2020.01)

(58) Field of Classification Search
CPC ... G06F 16/215; G06F 16/2365; G06F 40/205
USPC .......................................... 707/691
See application file for complete search history.

(56) References Cited

U.S. PATENT DOCUMENTS

| | | | |
|---|---|---|---|
| 2018/0276726 A1* | 9/2018 | Siddiqui | G06Q 30/0603 |
| 2019/0236740 A1* | 8/2019 | Rao | G06Q 10/08 |
| 2020/0034782 A1* | 1/2020 | Hsieh | G06N 3/045 |
| 2022/0114648 A1* | 4/2022 | van Horne | G06Q 30/0206 |

* cited by examiner

*Primary Examiner* — Michael Pham
(74) *Attorney, Agent, or Firm* — Fenwick & West LLP

(57) ABSTRACT

An online system maintains a product catalog including products from various retailers, from which users can purchase products. Each of the products are associated with attributes such as a size value and a size unit of measure (UOM). The online system identifies products with erroneous product attributes using taxonomy attribute value homogeneity. The online system performs an inference task in conjunction with the model serving system or the interface system to infer a correct size value and size UOM of the product. The online system evaluates the accuracy of the inferred size value and size UOM of the product. Responsive to determining that the inferred data is accurate, the online system updates the product catalog with the corrected product attribute information.

17 Claims, 5 Drawing Sheets

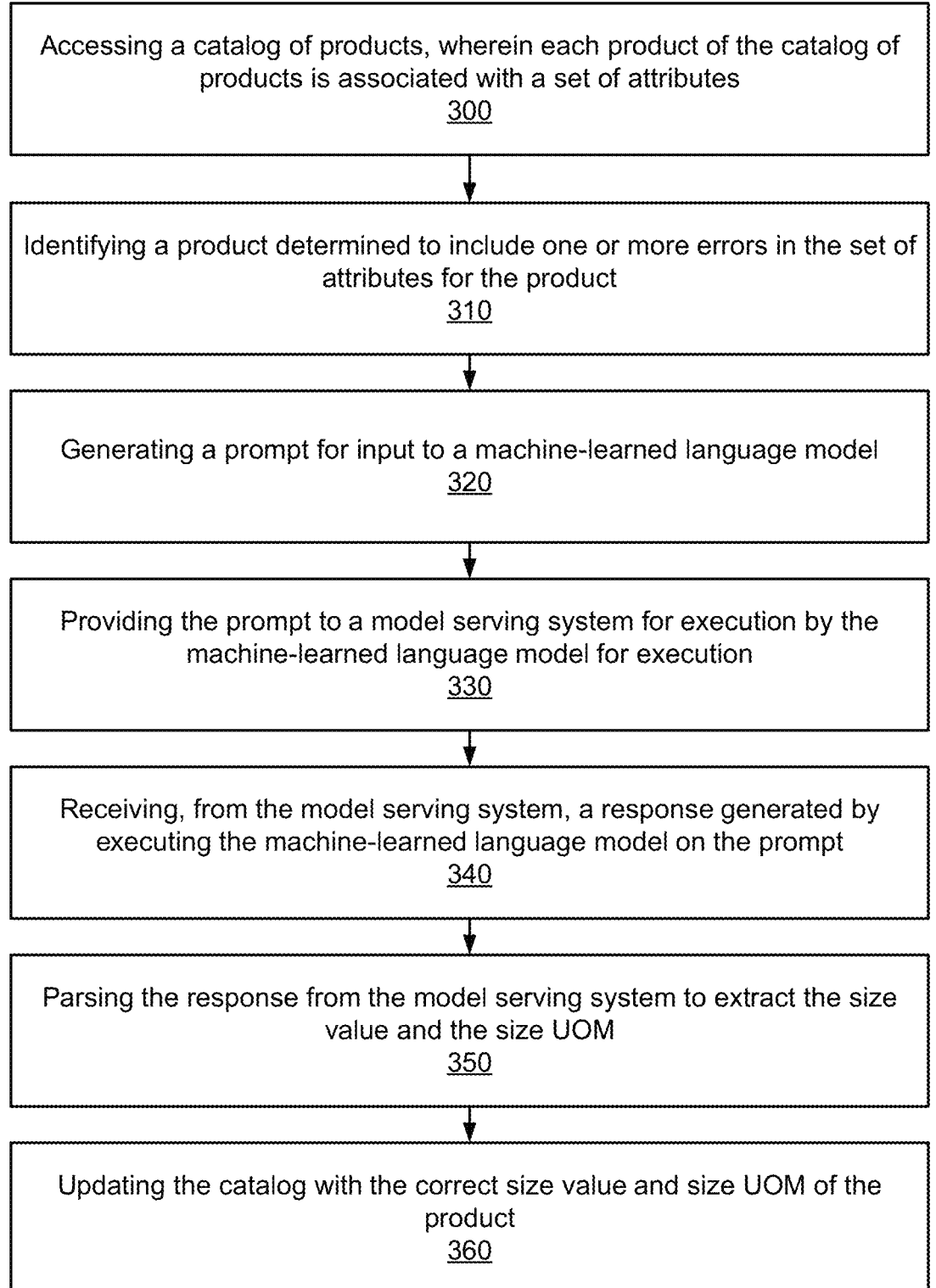

Accessing a catalog of products, wherein each product of the catalog of products is associated with a set of attributes
300

Identifying a product determined to include one or more errors in the set of attributes for the product
310

Generating a prompt for input to a machine-learned language model
320

Providing the prompt to a model serving system for execution by the machine-learned language model for execution
330

Receiving, from the model serving system, a response generated by executing the machine-learned language model on the prompt
340

Parsing the response from the model serving system to extract the size value and the size UOM
350

Updating the catalog with the correct size value and size UOM of the product
360

| Retailer | Title | Brand | ... | Size | Size UOM |
|---|---|---|---|---|---|
| Retailer A | 100% Orange Juice, Original, No Pulp | Brand A | ... | 18 | oz. |
| ... | ... | ... | ... | ... | ... |
| Retailer A | Fruit Punch Juice | Brand Z | ... | 52 | fl. oz. |

| Retailer | Title | Brand | ... | Size | Size UOM |
|---|---|---|---|---|---|
| Retailer A | 100% Orange Juice, Original, No Pulp | Brand A | ... | 16 | fl. oz. |
| ... | ... | ... | ... | ... | ... |
| Retailer A | Fruit Punch Juice | Brand Z | ... | 52 | fl. oz. |

FIG. 4B

AUTOMATED CORRECTION OF ATTRIBUTES USING MACHINE-LEARNED LARGE LANGUAGE MODELS (LLMS)

CROSS-REFERENCE TO RELATED APPLICATIONS

This application claims the benefit of U.S. Provisional Application No. 63/529,349, filed Jul. 27, 2023, which is incorporated by reference herein in its entirety.

BACKGROUND

An online system is an online platform that provides one or more online services. An example of an online service is allowing users to perform transactions associated with items. The items may represent physical entities stored in a physical location, such as groceries. A user can place an order for purchasing items from participating retailers via the online system, with the shopping being done by a picker. After the picker finishes shopping, the order is delivered to the user's address.

The online system maintains a catalog of purchasable items from multiple retailers. Oftentimes, data associated with a product may be erroneous due to inconsistencies or errors in the sources of the data, e.g., retailers mislabeling products. However, having inaccurate data in the catalog may lead to customer confusion, a lack of trust from the customer upon receiving an item different from what was purchased, or result in the inability for customers to find an item in the catalog. Thus, it is advantageous for the online system to maintain a catalog with accurate product data.

SUMMARY

In accordance with one or more aspects of the disclosure, the techniques described herein relate to a method for an online system identifying and correcting inaccurate product information from a product catalog. The online system maintains the product catalog which includes products from various retailers, from which users can purchase the products. However, the product data received from various sources are often erroneous and require correcting. For example, each of the products are associated with attributes such as a size value and a size unit of measure (UOM). The UOM attribute of products can have different types of errors. Types of errors may include garbage UOMs where the UOM field includes unintelligible data, and misplaced UOMs where count UOMs are used in place of size UOMs (e.g., 1 count instead of 1 lb). Another type of error includes misclassified UOMs where the UOM does not match the product type. For example, a can of soda which is a liquid state having an UOM of 16 ounces (oz), instead of 16 fluid ounces (fl oz).

The online system identifies products with erroneous product attributes using taxonomy attribute value homogeneity. The online system performs an inference task in conjunction with the model serving system or the interface system to infer a correct size value and size UOM of the product. The online system evaluates the accuracy of the inferred size value and size UOM of the product. Responsive to determining that the inferred data is accurate, the online system updates the product catalog with the corrected product attribute information.

BRIEF DESCRIPTION OF THE DRAWINGS

FIG. 3 is a flowchart for a method for identifying and correcting inaccurate product information from a product catalog, in accordance with some embodiments.

FIG. 4A illustrates an example product catalog before correcting the size data of a product, in accordance with one or more embodiments.

FIG. 4B illustrates an example product catalog after correcting the size data of a product, in accordance with one or more embodiments.

DETAILED DESCRIPTION

Figure 1A:
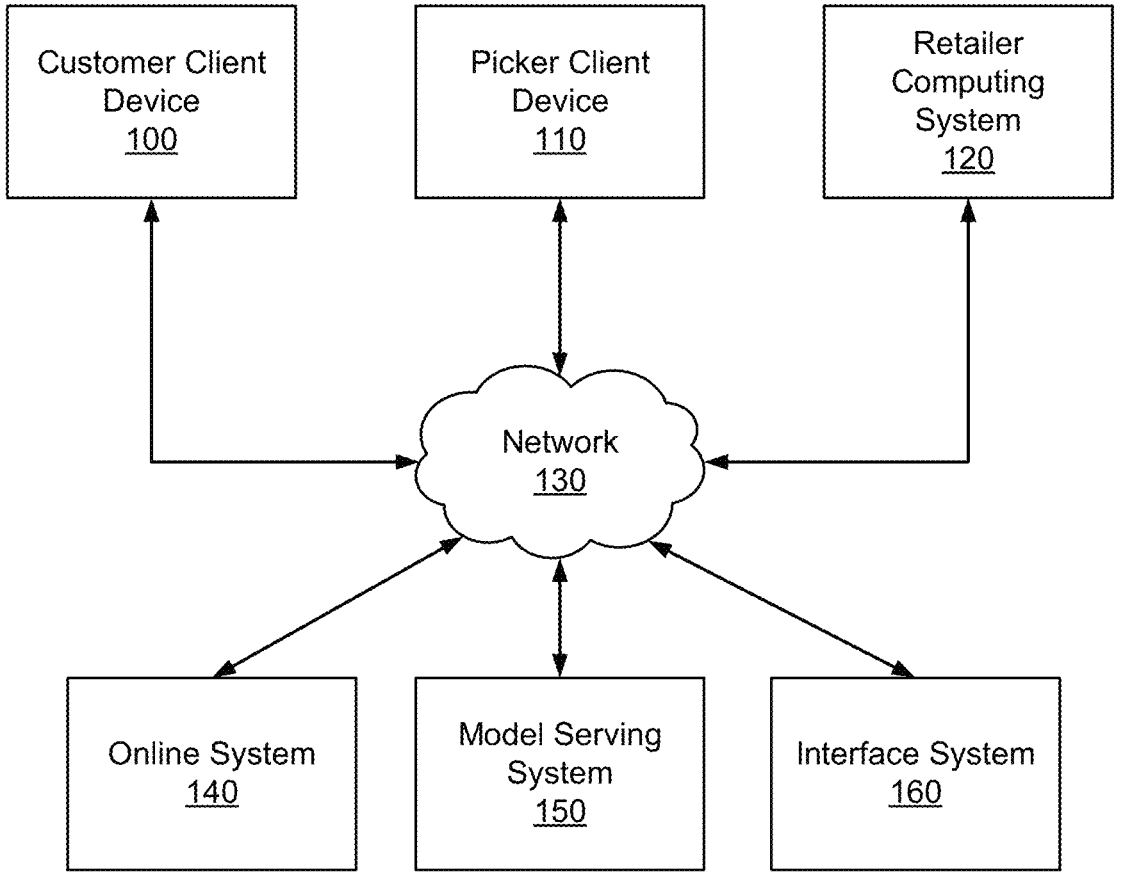
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives requests from the online system 140 to perform inference tasks using machine-learned models. The inference tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbot applications, and the like. In one or more embodiments, the language model is configured as a transformer neural network architecture. Specifically, the transformer model is coupled to receive sequential data tokenized into a sequence of input tokens and generates a sequence of output tokens depending on the inference task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the online system 140 or entities/systems different from the online system 140. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In one or more embodiments, the inference task for the model serving system 150 can primarily be based on reasoning and summarization of knowledge specific to the online system 140, rather than relying on general knowledge encoded in the weights of the machine-learned model of the model serving system 150. Thus, one type of inference task may be to perform various types of queries on large amounts of data in an external corpus in conjunction with the machine-learned model of the model serving system 150. For example, the inference task may be to perform question-answering, text summarization, text generation, and the like based on information contained in the external corpus.

Thus, in one or more embodiments, the online system 140 is connected to an interface system 160. The interface system 160 receives an external corpus of data from the online system 140 and builds a structured index over the data using another machine-learned language model or heuristics. The interface system 160 receives one or more task requests from the online system 140 based on the external data. The interface system 160 constructs one or more prompts for input to the model serving system 150. A prompt may include the task request of the user and context obtained from the structured index of the external data. In one instance, the context in the prompt includes portions of the structured indices as contextual information for the query. The interface system 160 obtains one or more responses to the query from the model serving system 150 and synthesizes a response. While the online system 140 can generate a prompt using the external data as context, oftentimes, the amount of information in the external data exceeds prompt size limitations configured by the machine-learned language model. The interface system 160 can resolve prompt size limitations by generating a structured index of the data and offers data connectors to external data and provides a flexible connector to the external corpus.

As described above, a user can use the ordering interface on a customer client device 100 to select desired items from a catalog and place an order with the online system 140. The online system 140 identifies erroneous item data from the catalog, corrects the identified erroneous product data in conjunction with a LLM, and updates the catalog with the correct item data. The online system 140 may leverage taxonomy attribute value homogeneity to identify the errors, which is further described in conjunction with FIG. 2. In some embodiments, a human in the loop may manually identify errors in the item data through an interface on a client device 100. The items with erroneous information may be provided to the online system 140 for correction.

The online system 140 constructs a prompt including the item information, and other additional contextual information such as examples of input and desired output to guide the LLM in constructing answers, and a task request to the LLM to infer the correct attribute for the item. In one primary example referred throughout the specification, the attribute data includes size data (e.g., size value and the size UOM information), which describes the magnitude of the primary property of the item or product. The attribute may include an attribute value (e.g., size value "16") and an attribute UOM (e.g., size UOM such as ml, fl. oz., oz., g). However, it is appreciated that in other embodiments, the correction method described below can be applied to other types of attributes other than size UOM. In some embodiments, the prompt may include possible size data from various sources. The LLM output may be used as a source of size data information.

The online system 140 validates the response from the LLM. For example, the online system 140 can determine an expected value (e.g., size value and UOM information) based on taxonomy attribute value homogeneity and can compare the LLM output to the expected value to validate the LLM output. The online system determines that the LLM output is accurate if the output of the LLM aligns with the expected value. Responsive to determining that the LLM output is accurate, the online system 140 updates the catalog with the corrected size data. If the LLM output does not align with the expected value, the online system 140 may provide the product data and the LLM output to the quality audit system, which may provide the data to a human in the loop to manually validate the LLM output.

In this manner, the online system 140 identifies and corrects item attribute data. This allows the online system 140 to maintain a catalog with accurate item data to facilitate a seamless shopping experience for users.

While conventional methods could be used as a way to find values for attributes of items, it is not a guaranteed way as the item descriptions may or may not include accurate data that customers need. It depends on the presence and clarity of information within the descriptions, which may vary widely in quality and detail. The disclosed method herein provides a more robust approach by using a LLM that cross-references multiple data sources. The disclosed method aims for higher reliability by fixing incorrect attribute values. By incorporating multiple sources into the prompt, the method enables the LLM to infer attribute values obtained from multiple sources, leading to more precise corrections.

Figure 1B:
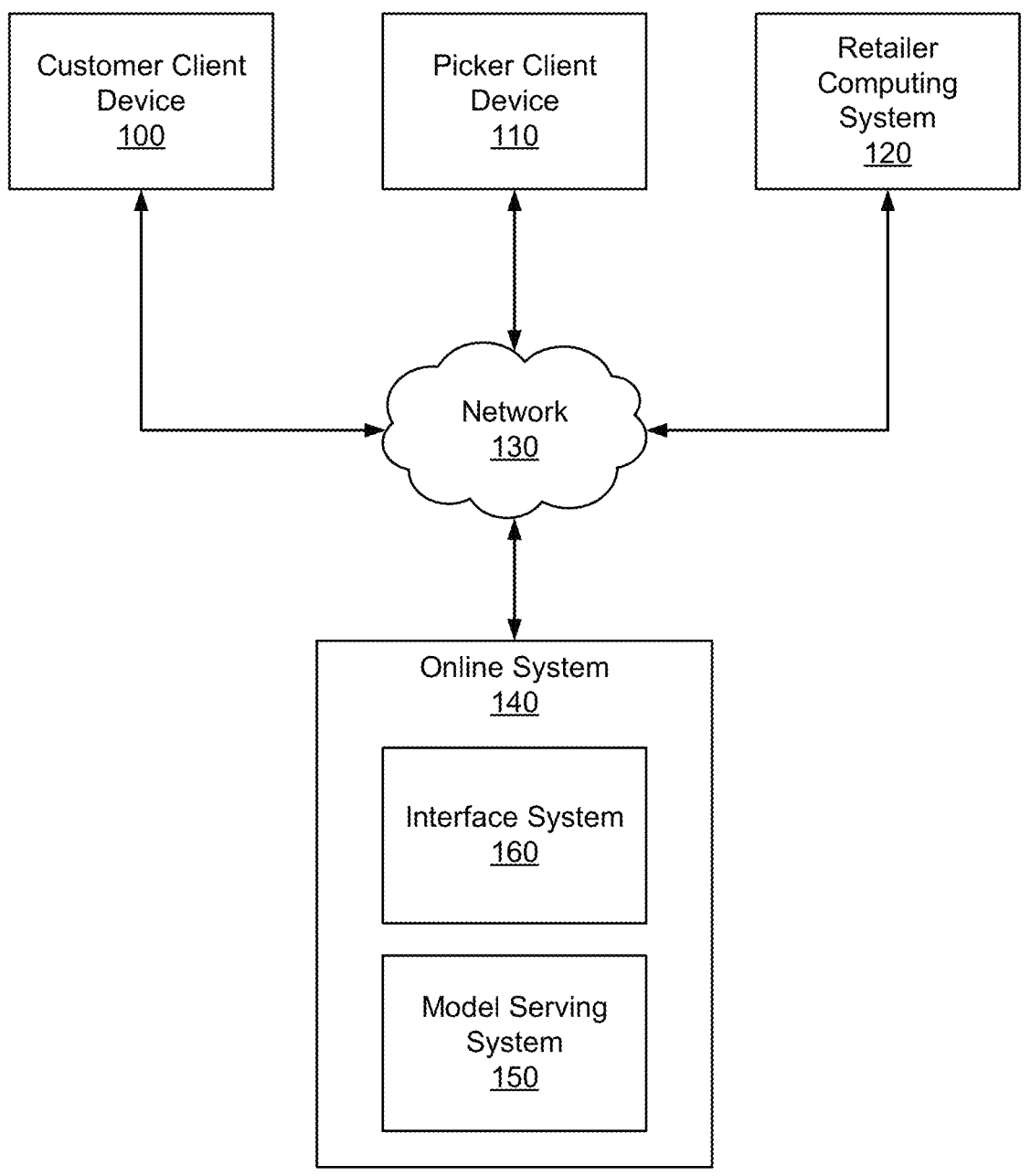
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 are each managed by an entity separate from the entity managing the online system 140. In one or more embodiments, as illustrated in the example system environment in FIG. 1B, the model serving system 150 or the interface system 160 is managed and deployed by the entity managing the online system 140.

Figure 2:
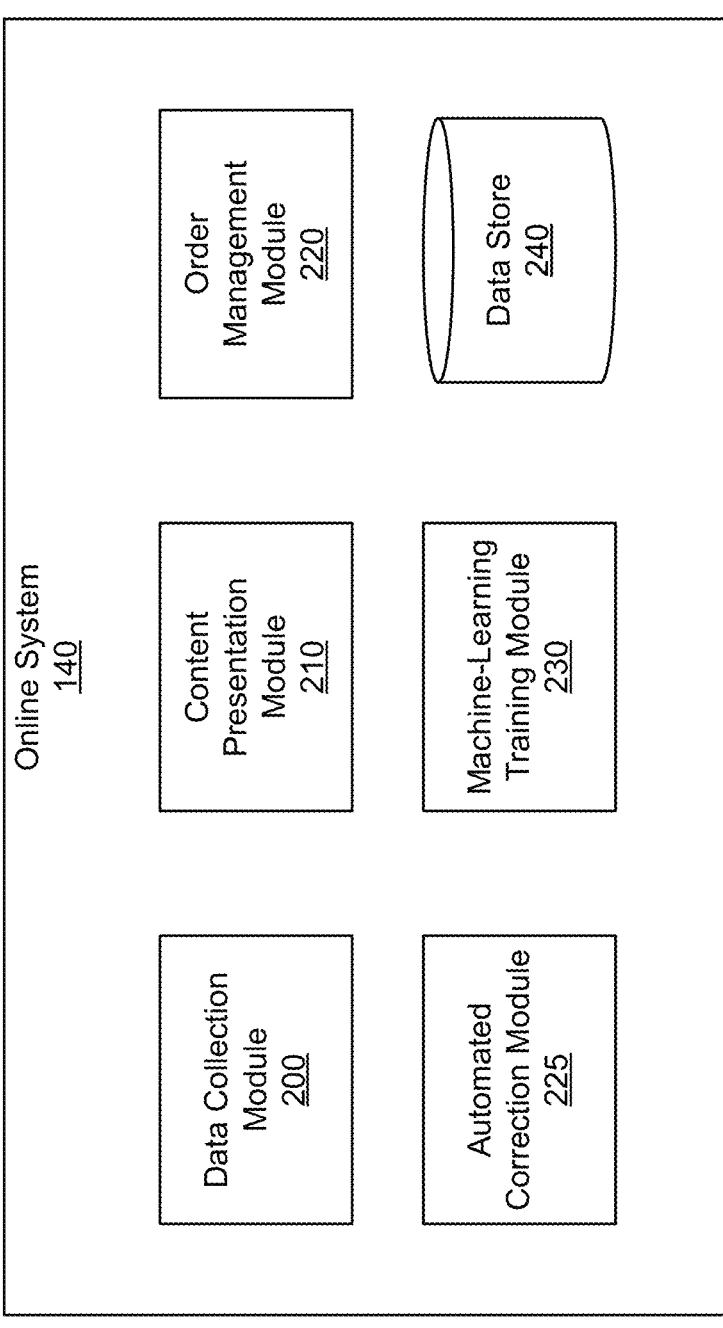
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, an automated correction module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

In one or more embodiments, the data collection module 200 also collects communication data, which is different types of communication between shoppers and users of the online system 140. For example, the data collection module 200 may obtain text-based, audio-call, video-call based communications between different shoppers and users of the online system 140 as orders are submitted and fulfilled. The data collection module 200 may store the communication information by individual user, individual shopper, per geographical region, per subset of users having similar attributes, and the like.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

In one or more embodiments, the content presentation module 210 receives one or more recommendations for presentation to the customer while the customer is engaged with the ordering interface. The list of ordered items of a customer may be referred to as a basket. As described in conjunction with FIGS. 1A and 1B, the recommendations are generated based on the inferred purpose of the basket of the customer and include one or more suggestions to the customer to better fulfill the purpose of the basket.

In one instance, the recommendations are in the form of one or more equivalent baskets that are modifications to an existing basket that serve the same or similar purpose as the original basket. The equivalent basket is adjusted with respect to metrics such as cost, healthiness, whether the basket is sponsored, and the like. For example, an equivalent basket may be a healthier option compared to the existing basket, a less expensive option compared to the existing basket, and the like. The content presentation module 210 may present the equivalent basket to the customer via the ordering interface with an indicator that states how an equivalent basket improves or is different from the existing basket (e.g., more cost-effective, healthier, sponsored by a certain organization). The content presentation module 210 may allow the customer to swap the existing basket with an equivalent basket.

In one instance, when the basket includes a list of edible ingredients, the recommendations are in the form of a list of potential recipes the ingredients can fulfill, and a list of additional ingredients to fulfill each recipe. The content presentation module 210 may present each suggested recipe and the list of additional ingredients for fulfilling the recipe to the customer. The content presentation module 210 may allow the customer to automatically place one or more additional ingredients in the basket of the customer.

The order management module 220 that manages orders for items from customers. The order management module 220 receives orders from a customer client device 100 and offers the orders to pickers for service based on picker data. For example, the order management module 220 offers an order to a picker based on the picker's location and the location of the retailer from which the ordered items are to be collected. The order management module 220 may also offer an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to offer an order to a picker based on a delivery timeframe requested by the customer with the order. The order management module 220 computes an estimated amount of time that it would take for a picker to collect the items for an order and deliver the ordered item to the delivery location for the order. The order management module 220 offers the order to a picker at a time such that, if the picker immediately services the order, the picker is likely to deliver the order at a time within the timeframe. Thus, when the order management module 220 receives an order, the order management module 220 may delay in offering the order to a picker if the timeframe is far enough in the future.

When the order management module 220 offers an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The automated correction module 225 may obtain item data from the catalog managed by the online system 140. The automated correction module 225 analyzes the item data to identify products with erroneous item information. The automated correction module 225 may implement an attribute value homogeneity analysis that assesses how homogeneous attribute values are at particular nodes within a taxonomy structure. The attribute value homogeneity analysis calculates, for each taxonomy node, the occurrences of each UOM among the existing products and determines the most common UOM used at the taxonomy node. For example, given a taxonomy node "Beverages>Juice>Fruit Juice>Acai Juice", the automated correction module 225 may identify one or more UOMs, each having its own percentage of occurrence, e.g., "ct": 2.6%, "each": 15.6%, "fl oz": 48%, "ml": 5.2%, and "oz": 26%. In this example, the automated correction module 225 may determine that the most common UOM used for "Acai Juice" is fluid ounces (e.g., across different brands of Acai Juice that are recorded in the item catalog) is "fl oz". Hence, the automated correction module 225 may infer, based on the type of the most common UOM, which in this example is a volume UOM, that any non-volume UOM (e.g., count, weight, weight/volume) is potentially incorrect. In other embodiments, the automated correction module 225 may identify UOM's with at least a threshold frequency or proportion of commonality.

This technique can be generalized to correcting an item's weight, name, brand, tags, and taxonomy or any other attributes. For example, if the attribute values of an item are significantly different from other items in the taxonomy node, the automated correction module 225 may infer that the product is in the wrong taxonomy node or requires correction.

Thus, in one or more embodiments, the automated correction module 225 based on the homogeneity analysis may identify a list of items or products in the catalog for which to correct attribute data for. In one instance, for a taxonomy node, the list of items or products are those which have attribute data that do not match the most common attribute property (e.g., UOM) for the taxonomy node. In other instances, the automated correction module 225 may identify items or products that have a weight UOM when they should have a volume UOM, items that have a volume UOM when they should have a weight UOM, items that have a weight/volume UOM when they should have a "count" UOM, or items that have a count UOM when they should have a weight/volume UOM.

The automated correction module 225 constructs a prompt including the attribute information, the size data from various sources, other additional contextual information such as examples of input and desired output to guide the LLM in constructing answers, and a task request to the LLM to determine the size value and the size UOM information. In some embodiments, the automated correction module 225 first constructs a contextual prompt which provides contextual information to the LLM, which guides the LLM in constructing answers to the proceeding prompts. An example contextual prompt to the LLM of the model serving system 150 may be:

"You are an AI assistant for the backend operations team for an ecommerce catalog.

Your job is to fix the size data for catalog products.

The size data has two parts size_value and size_uom.

For example, given the size "12 fl oz", "12" is the size_value, and "fl oz" is the size_uom.

You will be provided different item features, along with size data from different sources.

The size data and item features are not reliable and could contain errors.

Determine the best values for the end customer for the size_value and size_uom using the provided data.

Return the output in a valid json format with three fields: size_value, size_uom and notes.

The field notes should provide an explanation for your output.

For products with a weight-related uom, provide the result as oz.

For products with a volume-related uom, provide the result as fl oz.

Here are some examples with the guidelines explaining why the questions are answered the way it is in the example:

guideline: when generating the answer of a product with uom related to volume, such as liquids, beverages, etc., provide the uom as fl oz."

The automated correction module 225 constructs a prompt and a task request to the LLM to provide a size value and size UOM information for a specific product. The prompt to the LLM of the model serving system 150 may include:

"The current item being evaluated is:

[Product Details]

Here is the size data for this item:

[Size Data]."

where [Item Details] refers to the details of the product or item that the automated correction module 225 is requesting to evaluate for, and the [Size Data] includes existing sources of size data for that product.

In one or more embodiments, the automated correction module 225 obtains the size data for a particular item from multiple sources such as the retailer, the consumer-packaged goods (CPG) companies, manufacturer of the item, retailers selling the item, a human in the loop (e.g., admin edits), and the output of the LLM of the model serving system 150. Each source may be associated with a priority score, which indicates the reliability of the source. Accordingly, the LLM may rank the sources based on the priority score associated with each source. The LLM may determine the final size data values for an item based on the size data from the source associated with the highest priority score. For example, admin edits may be associated with the highest priority score, while a retailer may be associated with the lowest priority score as the data may be least accurate. In this scenario, the LLM may select the size data from the admin edits source as it has the higher priority score.

The output of the LLM may also be assigned a priority score. The priority score of the LLM output may be determined based on the accuracy of the LLM and can vary across different item categories. For example, the LLM may have a 90% accuracy in predicting the size data and size UOM information for fruit juices but have a 50% accuracy for household cleaning products. In this example, the output of the LLM for the fruit juice category is assigned a higher priority score. The automated correction module 225 may consider each source and their respective priority scores when determining the final attribute value for the item.

An example prompt to the LLM of the model serving system 150 may be:

"The product being evaluated is:

Product ID: "16469239"

Brand Name: "ABC Drinks"

Product Name: "Strawberry & Orange Juice Single"

Category: "Beverages>Juice>Fruit Juice>Fruit Juice Blends"

Description: "nan"

Here is the size data for this product:

1 pt 16 each 16 fl oz

16 FZ 16 oz

16."

The automated correction module 225 may receive a response from the LLM that may be:

"{{"size_value": 16.0, "size_uom": "fl oz", "notes": The product seems to be liquid, so fl oz makes sense as a uom for end customer.}}.

guideline: when generating the answer of a product with uom related to weight, such as grocery products in solid form, meat, produce, etc., provide the uom as oz."

In some embodiments, the automated correction module 225 may construct a prompt to the LLM without including the homogeneity unit in the prompt. For instance, the prompt may include domain-specific knowledge of the specific product (e.g., taxonomy node) and a task request to the LLM to provide a size value and size UOM information for the specific item. The LLM may access knowledge about relevant UOMs of various items from the trained parameters of the LLM. For example, the LLM may determine that beverages are likely to have a UOM that measures volume, such as fl oz. In another example, the LLM may understand that cans of soda are typically 12 or 16 fl oz. In some embodiments, the LLM may use the taxonomy node to access catalog data of the specific item stored at the data store 240.

The catalog data for the specific item may be obtained from multiple sources such as the retailer, the consumer-packaged goods (CPG) companies, a human in the loop (e.g., admin edits), and the output of the LLM of the model serving system 150. In some cases, the sources may provide conflicting information with each other, and the data may be noisy and incomplete and/or have various spelling or formatting errors, which can be corrected with the LLM. The catalog data may include known possible values of the attributes, e.g., known size value with known size UOM, and occurrences of the known possible values. In some embodiments, the catalog data may also include item categories, title, brand, descriptions, and the like. For example, the size data of a specific item may be present as free-floating text in the title or description that can be accessed by the LLM.

The LLM output may include the requested size value and size UOM information for the specific product. In some implantations, the LLM may normalize the received/accessed data. For example, the LLM may convert "gallons" to "gal" so that the format of the UOM is consistent. In another example, the LLM may perform conversions between different UOMs. The LLM may access the specific knowledge/information of the item and normalize the product's UOM by converting the UOM to, for example, a desired unit of the online system 140 or a homogeneity unit. In one example, eggs may have a homogeneity unit "dozen," and one specific package of eggs uses UOM of "package." The LLM may access information of the specific package of eggs and determine that one "package" includes six eggs.

The LLM may normalize the UOM of this specific package of eggs to the homogeneity unit "dozen" and update the size value accordingly.

The automated correction module 225 may validate the response from the LLM using the attribute value homogeneity algorithm described above. The LLM output can be compared to the expected size value and size UOM information. For example, the expected value may be the most homogenous (or commonly occurring value) in the items of the taxonomy node that the particular item is assigned to. Responsive to determining that the LLM output aligns with the expected size value and size UOM information, the automated correction module 225 updates the inaccurate item data to the corrected size value and size UOM output by the LLM. If the LLM output differs from the expected values, the automated correction module 225 provides the item and the associated inaccurate data to the quality audit system. The quality audit system may provide the data to a human in the loop for review and final validation. In this manner, the quality audit system may evaluate the accuracy of the LLM. In some cases, the difference may be a result of UOM conversion, for example, "oz" converted to "fl oz." Even though the output of the LLM may be different, the automated correction module 225 may automatically save/update the item data to the corrected size value and size UOP output by the LLM without going through the quality audit process.

Alternatively, the LLM output may be compared to known values in the catalog data. For example, the output form the LLM is leveraged as another source of size data information in the catalog data. As discussed, along with other sources, the LLM output may be associated with a priority score, indicating the reliability of the source. The final item size data may be determined based on the priority scores of the different sources (including the LLM output). For example, the LLM may rank the sources based on the priority score associated with each source. The final size data values for a product may be the size data from one or more sources associated with the highest priority scores (e.g., top 2 sources with highest 2 priority scores).

The automated correction module 225 uses feedback collected through the quality audit system to update the prompt to the LLM. For example, if it is determined through the audit process that the LLM has low accuracy on a particular item category, the human in the loop may update the prompt to the LLM to include more examples from the item category. This provides the LLM with more contextual information and guidance on the category that it has low accuracy in. In other embodiments, the prompt may be split into multiple fine-grained prompts (e.g., prompt chaining). The fine-grained prompts are provided to the LLM in succession to guide the LLM's response.

In one or more embodiments, the automated correction module 225 may further fine-tune parameters of the LLM to incorporate a plurality of training examples that are known instances of attribute value correction that are verified to be or not be correct attribute values. In one instance, an input of a training example includes a prompt including a request to correct an attribute for a respective item and the attribute values for the item from one or more sources (as described above). The training example also includes an output from the LLM of the estimated attribute value for the item that has been verified to be correct.

In one or more embodiments, the training examples are obtained from feedback from users on instances was the attribute values were verified because the item was flagged for human audit and the resulting attribute value for the item was verified by the human auditor. The automated correction module 225 applies parameters of the LLM to inputs of the plurality of training examples to generate estimated outputs. The automated correction module 225 computes a loss function indicating a difference between the outputs and the estimated outputs. One or more terms are backpropagated from the loss function to update parameters of the LLM.

The results generated by the LLM may be continuously audited to refine the prompt to the LLM. This involves systematically evaluating the LLM's outputs using the audit feedback to identify any issues to improve the accuracy of the output results. For instance, the LLM's performance is not good for certain types of items, e.g., the accuracy of the LLM outputs is low. To improve the quality of the LLM, the prompt to the LLM may be updated to reflect the characteristics of the products. For example, the updating process may include modifying the prompts to include in-context examples that highlight the specific types of items along with the correct or desired outputs for these products. In some embodiments, the prompts may be continuously updated by adding new items and/or new characteristics of the existing items. In some implementations, the catalog data may be continuously updated to keep the data information current and comprehensive. For instance, new items and new characteristics may be regularly added to the catalog data. The item categories and the taxonomy nodes in the taxonomy structure may be updated based on new data information of the items.

The performance of the LLM may be used to modify the priority level of the LLM output. For example, if the quality audit system determines that the LLM has low prediction accuracy in a particular category, the priority level of the LLM output is reduced and the prompt to the LLM is updated. The priority level of the LLM output is increased if the accuracy of the LLM increases. In some embodiments, the automated correction module 225 may dynamically adjust the priority levels of sources.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples.

Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

FIG. 3 is a flowchart for a method for identifying and correcting inaccurate product information from a product catalog, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system accesses 300 a catalog of products, wherein each product of the catalog of products is associated with a set of attributes. The set of attributes may include a size value and a size UOM. The online system identifies 310 a product determined to include one or more errors in the set of attributes for the product. The online system generates 320 a prompt for input to a machine-learned language model. The prompt may specify the product data, one or more size values and size UOM's of the product from one or more sources, and a request to infer a correct size value and size UOM of the product. The online system provides 330 the prompt to a model serving system for execution by the machine-learned language model for execution.

The online system receives 340 from the model serving system, a response generated by executing the machine-learned language model on the prompt. The online system parses 350 the response from the model serving system to extract the size value and the size UOM. The online system updates 360 the catalog with the correct size value and size UOM of the product, which is illustrated by FIGS. 4A and 4B.

FIG. 4A illustrates an example product catalog before correcting the size data of a product, in accordance with one or more embodiments. In one or more embodiments, the catalog shown in FIGS. 4A-4B is configured as a database structure, a data table in a cloud object store, and the like. As described above, each item listed on the product catalog is associated with a set of attributes. The online system 140 identifies the entry 410 associated with the product "100% Orange Juice, Original, No Pulp" from retailer A to include erroneous size value and size UOM attributes. In this example, the correct size value is 16 and the correct size UOM is fluid ounces (e.g., fl. oz.). The online system 140 corrects the erroneous attributes according to the process described in FIG. 3. The corrected entry 420 associated with the item is illustrated by FIG. 4B.

In some embodiments, the online system 140 validates the corrected attributes in the catalog. For example, the online system 140 may select one or more items that are updated with the size value and the UOMs output form the LLM. A human audit may validate the updated size value and the UOMs. Responsive to determining that the updated size value and UOMs include an error and/or a difference from the real/correct size value or UMOs, the online system 140 may identify causes/factors that lead to the error and correct the size value and UOMs. The identified error, causes, and the size value and UOM of the item may be used as feedback to re-train/fine tune the LLM.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
accessing a catalog database of items, wherein each item of the catalog of products is associated with a set of attributes, the set of attributes comprising at least a size value and a size unit of measure;
identifying an item determined to include one or more candidate errors in the set of attributes for the item;
identifying an expected size value and an expected unit of measure for the item;
generating a prompt for input to a machine-learned language model, the prompt specifying at least item data, one or more size values and size unit of measures of the item from one or more sources, and a request to infer a correct size value and size unit of measure of the item;
providing the prompt to a model serving system deploying the machine-learned language model for execution by the machine-learned language model;
receiving, from the model serving system, a response generated by executing the machine-learned language model on the prompt;
parsing the response from the model serving system to extract a size value and a size unit of measure for the item; updating the catalog database with the extracted size value and the extracted size unit of
measure in association with the item, wherein updating the catalog database comprises:
comparing the extracted size value and the extracted unit of measure from the response to the expected size value and the expected unit of measure; and
responsive to identifying that the extracted size value aligns with the expected size value and the extracted unit of measure aligns with the expected unit of measure, updating the catalog database with the extracted size value and extracted unit of measure as the size value and size unit of measure of the product.

2. The method of claim 1, further comprising:
responsive to identifying that the extracted size value does not align with the expected size value and the extracted unit of measure does not align with the expected unit of measure, providing the extracted size value and the extracted unit of measure to quality audit for validation.

3. The method of claim 1, wherein identifying the expected size value and the expected unit of measure further comprises:
identifying a taxonomy node for the item within a taxonomy structure;
identifying size values and unit of measures for a plurality of items within the taxonomy node; and
setting the expected size value and the expected unit of measure for the item as a size value and a unit of measure identified for a threshold number or proportion of items within the taxonomy node.

4. The method of claim 1, further comprising:
obtaining a set of estimated size values and unit of measures for the item including the extracted size value and the extracted unit of measure from the machine-learned language model;
assigning a priority score to each of the set of estimated size values and unit of measures;
ranking the priority scores; and
selecting the extracted size value and the extracted unit of measure having a threshold priority score as a correct size of value and unit of measure for the item.

5. The method of claim 1, further comprising:
validating the response generated by executing the machine-learned language model on the prompt, the validating comprising: identifying a difference between the response and an expected size value and an expected unit of measure for the item;
generating feedback reflecting accuracy of the response based on the validation; and

updating the prompt to the machine-learned language model using the feedback.

6. The method of claim 5, further comprising: updating the machine-learned language model using the feedback, wherein updating the machine-learned language model comprises:

generating one or more training examples using the feedback, each training example comprising an item that is validated, and validated size value and validated size unit of measure for the item;

applying the machine-learned language model to the one or more training examples;

obtaining an output size value and an output size unit of measure for the item from the machine-learned language model;

generating a loss that indicates a difference between the output size value and the output size of measure and the validated size value and validated size unit of measure; and backpropagating terms obtained from the loss to update parameters of the machine-learned language model.

7. The method of claim 1, further comprising:

retrieving the size value and the unit of measure for the item from the catalog database;

generating a content item including the retrieved size value and the unit of measure; and providing the content item for display on a client device.

8. A computer program product comprising a non-transitory computer readable storage medium having instructions encoded thereon that, when executed by a processor, cause the processor to perform steps comprising:

accessing a catalog database of items, wherein each item of the catalog of products is associated with a set of attributes, the set of attributes comprising at least a size value and a size unit of measure;

identifying an item determined to include one or more candidate errors in the set of attributes for the item;

identifying an expected size value and an expected unit of measure for the item;

generating a prompt for input to a machine-learned language model, the prompt specifying at least item data, one or more size values and size unit of measures of the item from one or more sources, and a request to infer a correct size value and size unit of measure of the item;

providing the prompt to a model serving system deploying the machine-learned language model for execution by the machine-learned language model;

receiving, from the model serving system, a response generated by executing the machine-learned language model on the prompt;

parsing the response from the model serving system to extract a size value and a size unit of measure for the item;

updating the catalog database with the extracted size value and the extracted size unit of measure in association with the item, wherein updating the catalog database comprises:

comparing the extracted size value and the extracted unit of measure from the response to the expected size value and the expected unit of measure; and responsive to identifying that the extracted size value aligns with the expected size value and the extracted unit of measure aligns with the expected unit of measure, updating the catalog database with the extracted size value and extracted unit of measure as the size value and size unit of measure of the product.

9. The computer program product of claim 8, wherein the instructions, when executed by a processor, cause the processor to perform steps comprising:

responsive to identifying that the extracted size value does not align with the expected size value and the extracted unit of measure does not align with the expected unit of measure, providing the extracted size value and the extracted unit of measure to quality audit for validation.

10. The computer program product of claim 8, wherein identifying the expected size value and the expected unit of measure further comprises:

identifying a taxonomy node for the item within a taxonomy structure;

identifying size values and unit of measures for a plurality of items within the taxonomy node; and setting the expected size value and the expected unit of measure for the item as a size value and a unit of measure identified for a threshold number or proportion of items within the taxonomy node.

11. The computer program product of claim 8, wherein the instructions, when executed by a processor, cause the processor to perform steps comprising:

obtaining a set of estimated size values and unit of measures for the item including the extracted size value and the extracted unit of measure from the machine-learned language model;

assigning a priority score to each of the set of estimated size values and unit of measures;

ranking the priority scores; and selecting the extracted size value and the extracted unit of measure having a threshold priority score as a correct size of value and unit of measure for the item.

12. The computer program product of claim 8, wherein the instructions, when executed by a processor, cause the processor to perform steps comprising:

validating the response generated by executing the machine-learned language model on the prompt, the validating comprising: identifying a difference between the response and an expected size value and an expected unit of measure for the item;

generating feedback reflecting accuracy of the response based on the validation; and updating the prompt to the machine-learned language model using the feedback.

13. The computer program product of claim 12, wherein the instructions, when executed by a processor, cause the processor to perform steps comprising:

updating the machine-learned language model using the feedback, wherein updating the machine-learned language model comprises:

generating one or more training examples using the feedback, each training example comprising an item that is validated, and validated size value and validated size unit of measure for the item;

applying the machine-learned language model to the one or more training examples;

obtaining an output size value and an output size unit of measure for the item from the machine-learned language model;

generating a loss that indicates a difference between the output size value and the output size of measure and the validated size value and validated size unit of measure; and backpropagating terms obtained from the loss to update parameters of the machine-learned language model.

14. The computer program product of claim 8, wherein the instructions, when executed by a processor, cause the processor to perform steps comprising:

retrieving the size value and the unit of measure for the item from the catalog database;

generating a content item including the retrieved size value and the unit of measure; and providing the content item for display on a client device.

15. A computer system comprising:

a processor; and a non-transitory computer-readable storage medium having instructions that, when executed by the processor, cause the computer system to perform steps comprising:

accessing a catalog database of items, wherein each item of the catalog of products is associated with a set of attributes, the set of attributes comprising at least a size value and a size unit of measure;

identifying an item determined to include one or more candidate errors in the set of attributes for the item;

identifying an expected size value and an expected unit of measure for the item;

generating a prompt for input to a machine-learned language model, the prompt specifying at least item data, one or more size values and size unit of measures of the item from one or more sources, and a request to infer a correct size value and size unit of measure of the item;

providing the prompt to a model serving system deploying the machine-learned language model for execution by the machine-learned language model;

receiving, from the model serving system, a response generated by executing the machine-learned language model on the prompt;

parsing the response from the model serving system to extract a size value and a size unit of measure for the item;

updating the catalog database with the extracted size value and the extracted size unit of measure in association with the item, wherein updating the catalog database comprises:

comparing the extracted size value and the extracted unit of measure from the response to the expected size value and the expected unit of measure; and responsive to identifying that the extracted size value aligns with the expected size value and the extracted unit of measure aligns with the expected unit of measure, updating the catalog database with the extracted size value and extracted unit of measure as the size value and size unit of measure of the product.

16. The system of claim 15, wherein instructions that, when executed by the processor, cause the computer system to perform steps comprising:

obtaining a set of estimated size values and unit of measures for the item including the extracted size value and the extracted unit of measure from the machine-learned language model;

assigning a priority score to each of the set of estimated size values and unit of measures;

ranking the priority scores; and selecting the extracted size value and the extracted unit of measure having a threshold priority score as a correct size of value and unit of measure for the item.

17. The system of claim 15, wherein instructions that, when executed by the processor, cause the computer system to perform steps comprising:

validating the response generated by executing the machine-learned language model on the prompt, the validating comprising: identifying a difference between the response and an expected size value and an expected unit of measure for the item;

generating feedback reflecting accuracy of the response based on the validation; and updating the prompt to the machine-learned language model using the feedback.

* * * * *